United States Patent [19]

Sundquist

[11] Patent Number: 4,575,128
[45] Date of Patent: Mar. 11, 1986

[54] SEAL, ESPECIALLY FOR A COUPLING BETWEEN AN AIR INTAKE ON A TILTING TRUCK CAB AND A PIPE SECURELY MOUNTED ON THE CHASSIS

[75] Inventor: Tommy Sundquist, Göteborg, Sweden

[73] Assignee: AB Volvo, Göteborg, Sweden

[21] Appl. No.: 654,012

[22] PCT Filed: Feb. 8, 1984

[86] PCT No.: PCT/SE84/00041
§ 371 Date: Sep. 18, 1984
§ 102(e) Date: Sep. 18, 1984

[87] PCT Pub. No.: WO84/03132
PCT Pub. Date: Aug. 16, 1984

[30] Foreign Application Priority Data

Feb. 9, 1983 [SE] Sweden ............... 8300679

[51] Int. Cl.4 .................................. F16L 55/00
[52] U.S. Cl. ........................... 285/9.2; 285/226; 285/239; 285/345; 285/DIG. 22
[58] Field of Search ............ 285/9, 226, DIG. 22, 285/239, 345

[56] References Cited

U.S. PATENT DOCUMENTS 1,925,984 9/1933 Novakovich ............... 285/9 R X
1,984,347 12/1934 Sutton et al. .
2,047,713 7/1936 Simpson ..................... 285/226 X
2,507,536 5/1950 Goodson .
3,388,705 6/1968 Grosshandler ............. 285/226 X
3,809,412 5/1974 Glover .
3,873,137 3/1975 Yamaguchi ................. 285/226
4,099,744 7/1978 Kutnyak et al. ............ 285/DIG. 22
4,186,949 2/1980 Bartha et al. ............... 285/226

FOREIGN PATENT DOCUMENTS 1065150 5/1954 France ....................... 285/226
1295520 5/1962 France ....................... 285/226
1465613 1/1967 France .
352720 1/1973 Sweden .
1213786 11/1970 United Kingdom ............ 285/226

Primary Examiner—Richard J. Scanlan, Jr.
Attorney, Agent, or Firm—Young & Thompson

[57] ABSTRACT

A rubber bellows (1) for sealing between an air intake on a spring-balanced, tilting truck cab and a connecting pipe (5) securely mounted on the chassis. The connecting pipe is provided at one end with a bead (7) and the bellows and the corresponding end with an interior lip (6), which when the bellows is connected to the pipe is forced over the bead and in its coupled position is inclined towards the bead, so that the force necessary to pull off the bellows is substantially greater than the force necessary for connecting the bellows.

4 Claims, 1 Drawing Figure

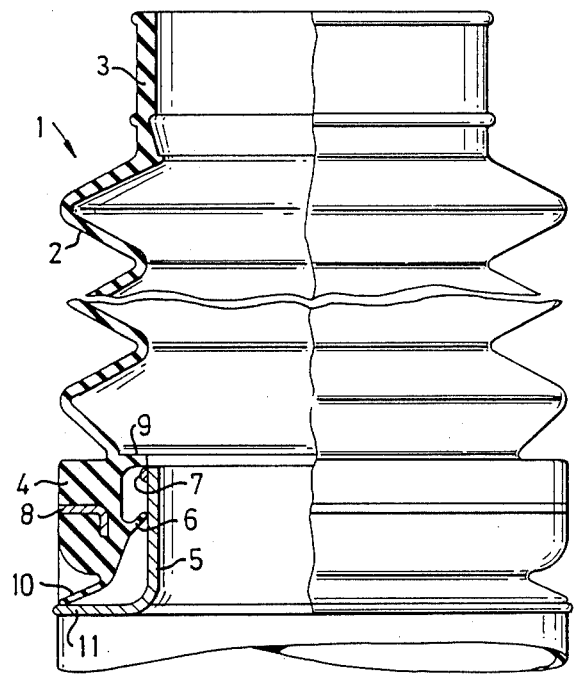

SEAL, ESPECIALLY FOR A COUPLING BETWEEN AN AIR INTAKE ON A TILTING TRUCK CAB AND A PIPE SECURELY MOUNTED ON THE CHASSIS

The present invention relates to a device for establishing a tight communication between an air intake mounted on a spring-balanced tilting truck cab and a connecting pipe securely mounted on the truck chassis, comprising a hose of elastic material, which at least over a portion of its length has a wall folded in the form of a bellows, the hose having one end designed to be secured to a first tubular element and the other end designed to be detachably coupled to a second tubular element.

A seal of this type can be designed for example to prevent dust, water, snow and the like from penetrating into the intake conduit from the engine air filter. It must permit a resilient movement of the cab relative to the chassis without any risk to the sealing function. Furthermore, it must be easily detachable and connectable when tilting the cab upward down. Ideally, it should be detachable without any particular manipulation when the cab is tilted and returned to its original sealing position automatically when the cab is tilted back to its operational position.

Sealing devices known up to now for the stated purpose fulfill the requirements to varying degrees. One device consists of a simple rubber bellows which merely abuts against a flange on the connecting pipe when the cab is tilted from the forward position back to the operational position.

This seal does not require any particular manipulation to be detached and reconnected, but on the other hand the risk of leakage is great, especially if there is a great bouncing movement of the cab relative to the chassis. It is also known to fix an equally simple rubber bellows to the connecting pipe on the chassis with the aid of a hose clamp. This does provide an effective seal in all positions, but it does require extra manipulation for detaching and reconnecting.

In a third device, a spring is used which presses the rubber bellows against the connecting pipe. It is true that this seal does not require any extra manipulation when the cab is tilted, but it is relatively expensive and complicated.

A fourth known device uses permanent magnets embedded in the bellows, which hold the bellows tightly to the connecting pipe. This solution is relatively expensive and requires that the connecting pipe be made of magnetic material.

The purpose of the present invention is to achieve a sealing device of the type described by way of introduction which is uncomplicated and inexpensive and provides a completely satisfactory seal even if there is significant movement of the cab as well as being automatically uncoupled and recoupled when the cab is tilted forward and back.

This is achieved according to the invention by a device which is characterized in that the second end of the hose is provided on its inside with at least one annular lip inclined towards the first end of the hose and that the second tubular element is provided on its outside with at least one annular bead, which, when the hose is mounted, is disposed axially inside the lip, the hose and the second tubular element having interacting parts, abutting against each other and causing a compression of the folded portion when the tubular elements are moved towards each other. By virtue of this design with an inclined lip, the lower portion of the hose can be pressed with very little force over the bead on the chassis connecting pipe. Due to the direction of incline of the lip and the friction between the lip and the connecting pipe, however, a much greater force is required to pull the lip over the bead in the opposite direction, which means that the hose will be held securely in place and provide a fully satisfactory seal even during large cab movement. When the cab is tilted, however, this force is not so great as to present any problem in pulling the hose off the connecting pipe. An advantage of the design according to the invention over the known design with embedded magnets is that a secure coupling is achieved regardless of the material in the connecting pipe. It need not consist of a ferromagnetic material, but can be made of plastic for example.

The invention will be described in more detail below with reference to examples shown in the accompanying drawing. The FIGURE shows a side view in partial section of a sealing device.

The hose 1 shown in the FIGURE consists of a flexible material, e.g. rubber, and has a folded bellows portion 2, a connecting portion 3 and a connecting portion 4. The portion 3 has smooth interior and exterior lateral surfaces and is designed to be securely attached with the aid of a hose clamp to a connecting pipe (not shown), e.g. to an intake air filter mounted on a tiltable truck cab. The portion 4 is coupled to a connecting pipe 5 securely mounted on the chassis.

According to the invention, the portion 4 is provided with an interior annular lip 6, which is inclined axially inwards, i.e. in the direction of the end portion 3. Furthermore, the pipe 5 is provided at its end edge with a bead 7 of semicircular cross section, which when the hose has been mounted, is disposed axially inside the lip 6, as can be seen in the FIGURE. With this construction, the lip will provide relatively little resistance when the portion 4 is slipped on to the pipe 5. On the other hand, the lip will provide significantly greater resistance when the hose is pulled off the pipe 5, since the pressure of the lip against the pipe will increase when the lip strikes the bead. Only after the lip has been deformed enough to fold outwards can the hose be pulled off the pipe. The lip and the bead thus function as a sort of snaplock.

As can be seen in the FIGURE, the connecting portion 4 has a substantially greater wall thickness than the rest of the hose. A metal stiffener ring 8 is embedded in the wall, in order to ensure that the portion 4 will keep its shape adapted to the pipe end. The thickness of the material and the ring will provide weight to the portion 4 to keep the bellows extended when hanging free (cab tilted forward). This in addition to the height of the pipe 5 will ensure that when the cab is tilted back in place and the bellows is compressed against the bead, there will be sufficient force to snap the locking lip over the bead, i.e. so that the force to press the lip downwards over the bead will not be greater than the force required for a certain predetermined compression of the bellows portion 2 of the hose.

The bouncing movement of the cab is compensated for primarily by compression and expansion of the bellows portion 2. Axially inside the lip, there is a radial flange 9 which in the lower end position forms an abutment against the bead 7. To prevent the deposit of contaminents on the outside of the pipe 5, which could cause heavy wear on the lip 6 as it moves relative to the pipe, the hose portion 4 is provided at its lower end with an extra sealing lip 10 which is in contact with a radial flange 11 on the pipe 5. The length of the lip 10 is selected so that the edge of the lip rests against the flange 11 even when the lip 6 abuts against the lower edge of the bead 7.

I claim:

1. A device for establishing a tight communication with a first tubular element, said device comprising a hose of elastic material, which at least over a portion of its length has a wall folded in the form of a bellows, said hose having a first end for securing to said first tubular element, and in combination with said hose a second tubular element comprising an annular bead; said hose having a second end for detachably securing said hose to said second tubular element, said second end comprising a wall of greater thickness than said bellows portion, and an inwardly extending solid annular lip on said thicker wall; said second hose end and said second tubular element being so dimensioned that when said second end of said hose and said end of said second tubular element are coupled, said annular lip passes over said annular bead and occupies a position in contact with said second tubular element and inclined toward said bead such that uncoupling of said hose and said second tubular element requires substantially greater force than does coupling.

2. Device according to claim 1, wherein said second end of said hose comprises an additional annular lip which is disposed axially outside the first-mentioned annular lip and extends obliquely outward from the said second hose end, and wherein the second tubular element comprises, spaced axially outside the bead, an annular radially outwardly directed flange, against which said additional annular lip abuts, when the said hose and said end of said second tubular element are coupled.

3. Device according to claim 2, wherein said thicker wall portion of said second hose end comprises at least one stiffener ring embedded in this portion.

4. Device according to claim 2, wherein the hose comprises a radially inwardly directed abutment flange disposed axially inside of the first mentioned lip for abutting against the said annular bead to limit further insertion of said second tubular element into said hose, the axial length of the additional lip being at least equal to the distance between the abutment flange and the first mentioned lip.

* * * * *